United States Patent [19]

McCrosson

[11] Patent Number: 5,680,832
[45] Date of Patent: Oct. 28, 1997

[54] CHANGEABLE LENGTH ANIMAL LEASH

[76] Inventor: Andrew Wallace McCrosson, 28 Bateau Rd., Hilton Head Island, S.C. 29928

[21] Appl. No.: 763,716

[22] Filed: Dec. 13, 1996

[51] Int. Cl.⁶ ..................................... A01K 27/00
[52] U.S. Cl. ............................................. 119/797
[58] Field of Search ................. 119/797, 792, 119/770, 771, 795

[56] References Cited

U.S. PATENT DOCUMENTS

| | | | |
|---|---|---|---|
| 1,924,596 | 8/1933 | Davis | 119/797 |
| 2,369,225 | 2/1945 | George | 24/193 |
| 2,861,547 | 11/1958 | Dale | 119/797 |
| 3,332,398 | 7/1967 | Mintz | 119/797 |
| 3,752,127 | 8/1973 | Baker | 119/797 |
| 3,884,190 | 5/1975 | Gurrey | 119/797 |
| 4,489,466 | 12/1984 | Bakker | 24/489 |
| 4,751,772 | 6/1988 | Crowle | 24/170 |
| 4,763,609 | 8/1988 | Kulik | 119/797 |
| 4,998,507 | 3/1991 | Browning | 119/797 |
| 5,247,906 | 9/1993 | Stevenson | 119/795 |
| 5,291,856 | 3/1994 | Goller | 119/795 |
| 5,351,654 | 10/1994 | Fuentes | 119/770 |
| 5,361,726 | 11/1994 | Harris | 119/797 |
| 5,363,810 | 11/1994 | Kraus | 119/795 |
| 5,462,019 | 10/1995 | Hong-Rong | 119/795 |

FOREIGN PATENT DOCUMENTS 461102  6/1928  Germany ................. 119/797

*Primary Examiner*—Gene Mancene
*Assistant Examiner*—Yvonne R. Abbott
*Attorney, Agent, or Firm*—Loyd W. Bonneville

[57] ABSTRACT

Leash whose length is adjusted by operating a leash length adjustment unit and the steps required in the method of its manufacture.

7 Claims, 4 Drawing Sheets

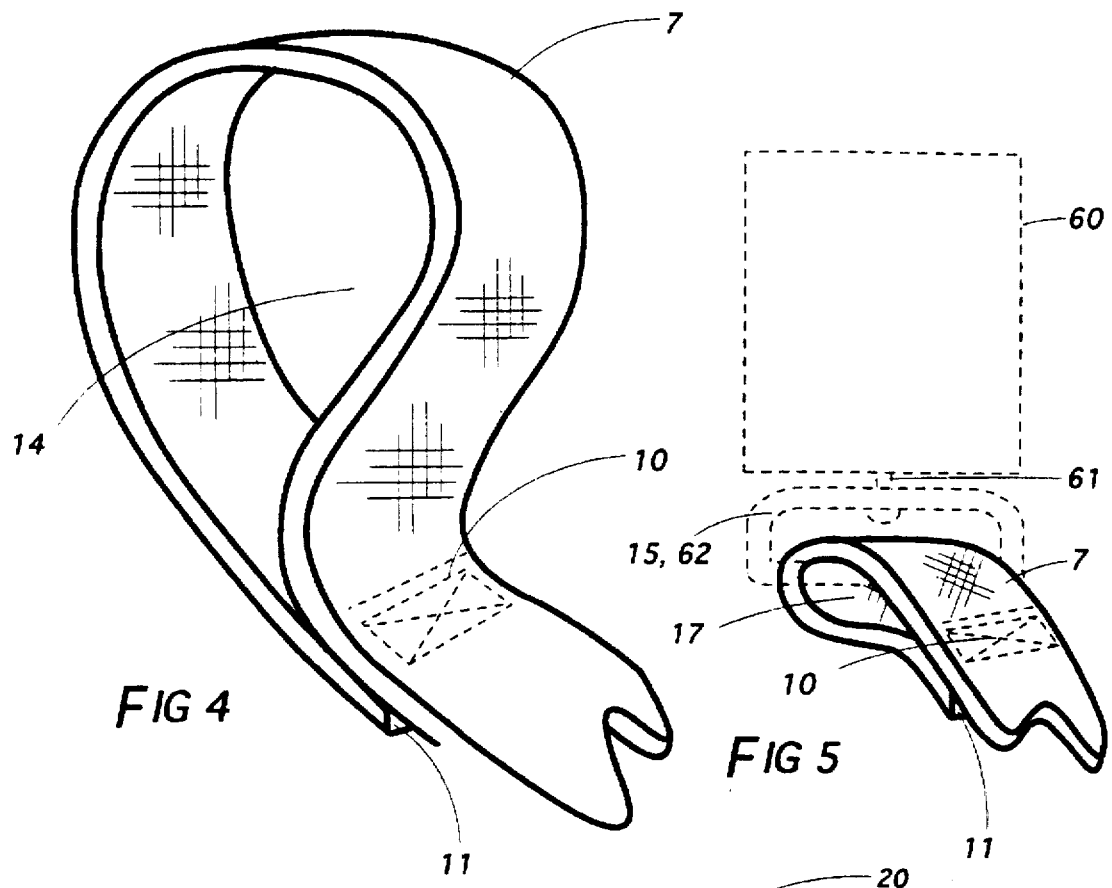
FIG 4
FIG 5
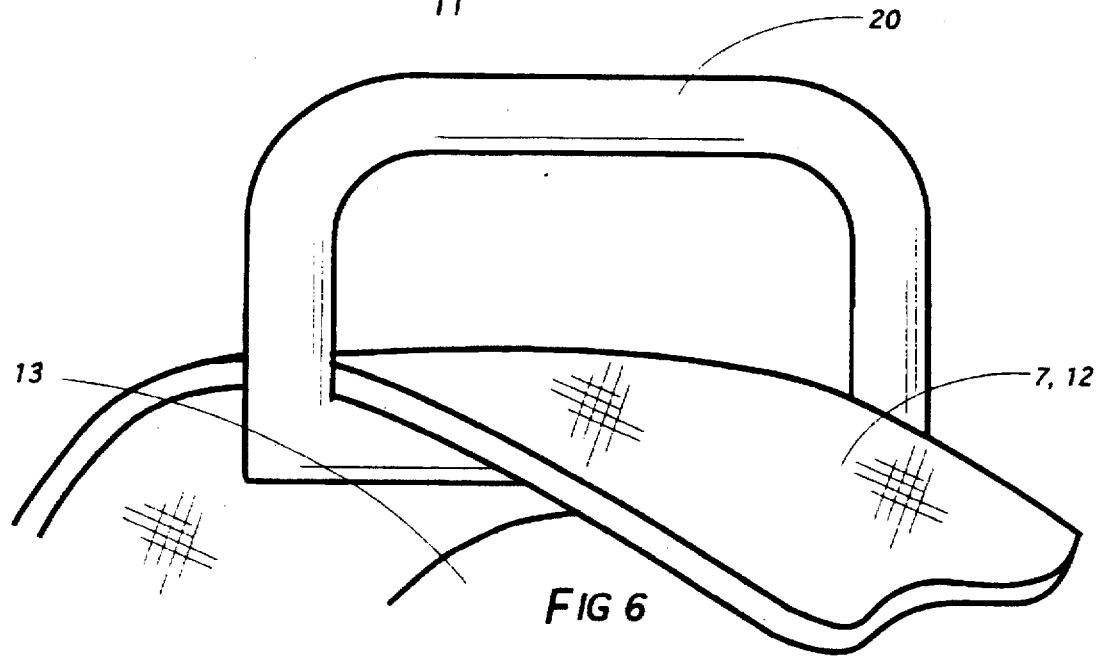
FIG 6

CHANGEABLE LENGTH ANIMAL LEASH

BACKGROUND OF THE INVENTION

1. Field of the Invention

Pet Accessories

2. Description of the Prior Art

Occasionally, a descriptive term in this application may be shortened so as to recite only a part rather than the entirety thereof as a matter of convenience or to avoid needless redundancy. In instances in which that is done, applicant intends that the same meaning be afforded each manner of expression. Thus, the term strap pinching adjustment slide might be used in one instance but in another, if meaning is otherwise clear from context, expression might be shortened to adjustment slide or merely slide. Any of those forms is intended to convey the same meaning.

The term emplace or any of its forms when used in this application means the joining of two objects or parts so as to unite them in a reasonably easily removable way, such as the snapping in place of a swivel clasp (60) to a point of connection on the dog, such as a ring on its collar, discussed ante. The word emplace is also consistent in meaning with the word "detachable" as occasionally used in common parlance but not in this application, since it is derived from the root word attach. The term attach or fasten or any of their forms when so used means that the juncture is of a more or less permanent nature, such as might be accomplished by nails, screws, welds or adhesives. Employment of the words connect or join or any of their forms is intended to include the meaning of both in a more general way.

Over the decades, several patents have been issued for a variety of animal (101) leashes. All of them represent attempts to meet fairly universal objectives concerning the escorting and leashing in public of animals (101), reference generally having being made to dogs (101). The concerns include avoiding both the operator's (100) and the dog's (101) entanglement in the leash during its use; safely restraining it (101) when held in place at the curb from bursting into the street; reining it (101) in to increase sidewalk space for approaching pedestrians, bicyclers, joggers as well as other dogs; steering it away from trash, mudholes, flowerbeds, private yards and hazards such as open manholes; and preventing it (101) from annoying persons with whom the operator (100) stops to talk or from wrapping itself (101) around those persons, trees, parking meter posts and similar objects. Once the dog (101) becomes entangled with anything, leash control becomes increasingly difficult.

Additionally, one's attempt to leash an animal (101) closely often results in painful wrist fatigue. Often, too, one (100) is vulnerable to losing the dog's (101) control at the very moment an attempt is being made to rein it (101) in because in order to do so, the operator (100) must shift the point of tension from one part of the leash to another. Whatever method is employed to that end, that interim should be as short as possible.

All of the foregoing objectives comprise needs for which solutions should be found.

As mentioned, leash design has generally been directed to control the dog (101) as a household pet. The leashing also of children in public is now a matter of priority, however. In addition, there are needs of a more commercial nature such as the control of animals (101) on the farm as well as other instances such as at the zoo. There are also other less likely but nevertheless, needful circumstances in which a wild animal (101) requires special handling such as that which might be afforded by a person (100) the animal (101) is unlikely to endanger or by two persons (100) acting in concert on each side of one for 1 simultaneous escort and restraint.

Whatever the object of restraint is or has been, the design of an improved leash has been undertaken by many with the foregoing objectives in mind. A leash should permit one to quickly pull an animal (101) in close to the operator (100) or frequently maintain it (101) in a tightly leashed relationship to him or her (100). It should also be so constructed as to require less effort to rein in the animal (101) than do conventional leashes. The leash's design should not be unduly cumbersome. It's cost of manufacture should be low so as to make it more readily available to consumers. Further, the reining in of an animal should not be limited to fixed predetermined intermediate distances but rather, feature unlimited versatility by providing a range of continuity over which it might be done. Such versatility would also be useful in limiting the animal's (101) permissible range of action when temporarily tethering it to a fixed object such as a tree, parking meter post or other such object as is occasionally required to be done.

In a number of patents, the leash was designed for shortening by operably selecting one or more points along the leash's length to fasten another part of it to. The design of some of those permits a doubling up of the leash reducing its length to half what it would otherwise be. Those patents include the following: U.S. Pat. No. 5,462,019 issued to Hong-Rong et al.; U.S. Pat. No. 5,363,810 issued to Kraus; U.S. Pat. No. 5,361,726 issued to Harris et al; U.S. Pat. No. 5,351,654 issued to Fuentes; U.S. Pat. No. 4,763,609 issued to Kulik; U.S. Pat. No. 4,489,466 issued to Bakker, U.S. Pat. No. 3,752,127 issued to Baker; and U.S. Pat. No. 3,332,398 issued to Mintz. U.S. Pat. No. 4,489,466 issued to Bakker features a pair of fasteners for suspenders with a ratchet mechanism to enhance gripping upon closure of a set of "jaws". None of the others permit spur-of-the-moment adjustment during use from full length downward to any desired intermediate position before reaching half length. Additional problems arise, such as with the Baker device, where upon clipping the hand loop to the dog's collar to reduce the leash length by one-half, the hand loop cannot itself then be employed.

The devices of the prior art, thus, require the operator to select from perhaps one, two or three intermediate positions, effectually reducing leash length to that predetermined by the fixed locations of the intermediate fastening points. Those devices entail either the loss of control vulnerability during shifting of hand holds mentioned supra or simultaneous two-handed, two-loop control, so as to be prepared to change the effective length of the leash.

Considerable effort was expended in the prior art to construct one or more operator hand loops (14) on the leash strap (7) so as to provide alternative holding points on the leash as a means of controlling leash length. U.S. Pat. No. 5,363,810 issued to Kraus cites and discusses two patents which represent early attempts along those lines.

Early attempts at leash design encountered difficulty in constructing auxiliary strap loops (14) which became inaccessible because of flattening due to the animal's (101) tug upon the leash. Two are discussed in U.S. Pat. No. 5,363,810 issued to Kraus. The trend thereafter has generally been that described, supra, by providing either connection rings or auxiliary loops (14) with which the operator's leash end (1)

may engage upon folding back. One of the patents considered, U.S. Pat. No. 5,361,726 issued to Harris et al, employs what the inventor termed a "carabiner", a term currenly used to describe a four inch connecting link with a spring tensioned member to permit the connection, such as that used by mountain climbers. That device like the others permits only a limited and specified number of predetermined connection points. Moreover, as mentioned, none of them permit a change in leash length to be made quickly without momentarily risking the animal's (101) escape or the loss of its (101) control.

Devices in the prior art of lesser relevance but perhaps of some interest are: U.S. Pat. No. 5,291,856 issued to Goller; U.S. Pat. No. 5,247,906 issued to Stevenson; U.S. Pat. No. 4,998,507 issued to Browning; U.S. Pat. No. 4,751,772 issued to Crowle; U.S. Pat. No. 3,884,190 issued to Gurrey; U.S. Pat. No. 2,369,225 issued to George; and U.S. Pat. No. 1,924,596 issued to Davis. U.S. Pat. No. 4,751,772 issued to Crowle and U.S. Pat. No. 2,369,225 issued to George comprise types of belts which connect two companion parts together, the first comprising a structure with one or more locking latches; the second, a traveler's seat belt. While the others generally comprise leashes, they comprise those of semi-flexible construction, mainly to address leash entanglement problems. Because of their limited relevance, applicant has addressed them separately by affidavit and itemized them in an exhibit thereto comprising a supplemental disclosure list.

The prior art discloses no leash which meets the needs and objectives discussed supra; no leash which can be adjusted quickly and with minimal effort during use; none which fixes the adjustment at any one of an infinite number of intermediate positions between full and half length.

SUMMARY OF THE INVENTION

The invention comprises a combination of conventional objects brought together and constructed to form a novel leash which provides easily controlled variable distance restraint upon a leashed animal (101) escorted by an operator (100). It further comprises a method of employing those conventional objects to permit such versatility in restraint.

This adjustable length leash comprises three units (2, 4, 5, respectively) and a particular way in which they are interconnected. They comprise an operator handling unit (2), an animal restraining unit (4) and a leash length adjusting unit (5). The operator handling unit (2) comprises that part of the leash the operator grasps and retains. It may comprise a hand loop (14) to provide a suitable grip. The animal restraining unit (4) comprises that part of the leash which connects to the animal (101). It may comprise a clasp (60) and swivel (61) combination clipped to an animal's collar ring. The leash adjusting unit (5) is that part of the leash the operator (100) moves along the leash strap (7) to lengthen or shorten the leash. It may comprise what is referred to herein as a strap pinching adjustment slide (50), described in detail ante. The three units (2, 4, 5, respectively) are connected together by a leash strap (7), part of which upon assembly forms a leash loop (13). During operator (100) adjustment, the length of the leash loop (13) is changed by half the distance the adjustment slide (50) is moved, explained in greater detail, ante. By reason of a particular principle of physics, also discussed ante, that feature of the leash allows one to adjust its length with less effort than would otherwise be required.

The invention, therefore, represents a highly significant break with inventive tradition in that it not only provides means to quickly adjust the leash to any one of an infinite number of positions between full and half length but means as well for making any change in leash length with less effort than that required by conventional leashes.

BRIEF DESCRIPTION OF THE DRAWINGS

FIG. 4 is a perspective view of a leash strap hand loop (14) comprised of loop closure fastening means (10) of stitchwork. FIG. 5 depicts the animal restraining unit (4) comprised of a clasp (60, described ante), swivel (61) and ring (62), all represented by dashed lines. The figure further shows the attachment loop (17) at the leash strap's second end (11, ante) with stitching as the loop closure fastening means (10). FIG. 6 is a perspective view of an operator's handle ring (20), showing a portion of the strap's midlength (12) in position to slide through it (20).

DESCRIPTION OF THE PREFERRED EMBODIMENT

Figure 1:
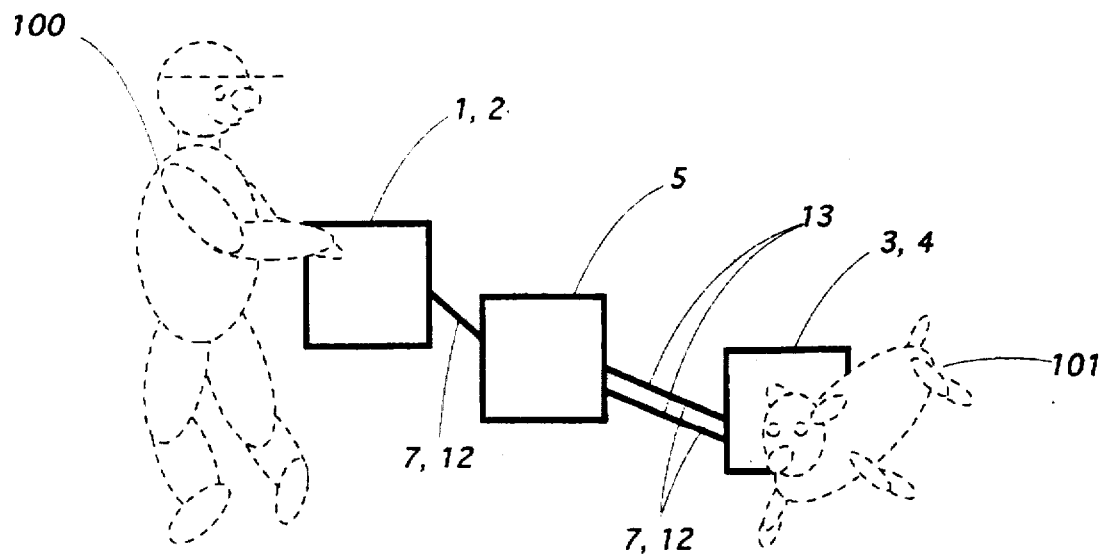
FIG. 1 shows an operator (100) holding an end of the leash which is the subject of this invention with a dog (101) connected to the other end of it, its respective units represented by labeled rectangular box symbols, and showing the leash loop (13) proximate the dog (101).
Figure 2:
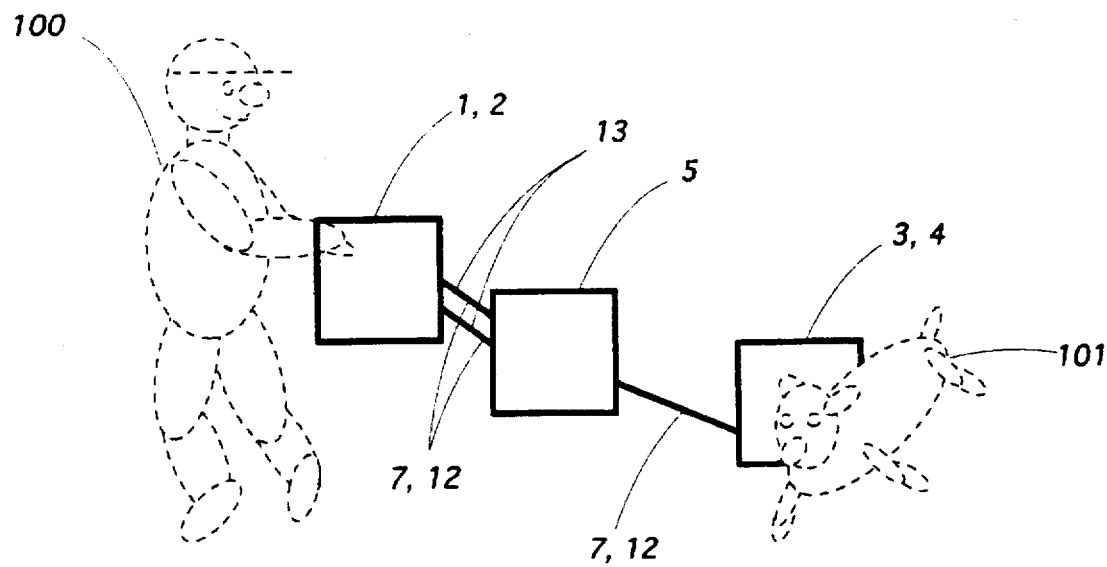
FIG. 2 is a similar representation but showing the leash loop (13) proximate the operator (100).

The invention comprises a combination of objects well known in the prior art as well as a method for their assembly for an advantageous product. Applicant does not claim inventive rights in any of the constituent objects of his invention but in the entirety of the combination thereof. It is the manner in which the objects are put together and the totality of the unified combination, applicant believes, which lend patentable novelty to the invention.

The major parts of the invention are the operator handling unit (2), an animal restraining unit (4), a leash length adjusting unit (5) and a conventional leash strap (7) interconnecting the three units (2, 4, 5, respectively).

The operator handling unit (2) comprises that part of the leash the operator grasps and retains. When present, it (2) is always located at the leash's first end (1). There is a distinction which must be kept in mind concerning the leash ends (1, 3, respectively) themselves and the strap ends (8, 11, respectively). As explained in detail, ante, the strap's first end (8) is always located at the leash length adjusting unit (5). The strap's second end (11), however, may be located at either the leash's first (1) or second end (3). When located at the leash's first end (1), which is the preferred location for reasons discussed ante, it (11) may comprise nothing more than the end (11) itself. However, it (11) may comprise a hand loop (14) to provide a firm leash grip. If no hand loop

(14) were present, it might be necessary to wrap the second strap end (11) around the operator's hand or wrist to provide a firm grip on the leash. In view of what has been discussed supra concerning the needs a leash should fulfill, such a configuration might be counter productive. It is preferred by far that the strap's first end (11) comprise a hand loop (14). However, it is intended that the invention include any embodiment of the operator handling unit (2) as an optional matter.

When the strap's second end (11) is located at the lesser preferred site—that of the leash's second end (3)—the strap's leash loop (13), described in greater detail ante, is proximate the leash's first end (1). The strap (7) of the leash loop (13) must in that configuration be permitted to slide freely through the operator handling unit (2). The leash loop itself (13) of course could be grasped and held in a manner that permits it (13) to slide freely through the hands of the operator (100). It is preferred in such case, however, that an operator's handle ring (20) through which that portion of the strap (7) may slide be provided and that he ring (20) be D-shaped so as to permit that portion of the strap (7) sliding though it to do so without obstruction from the rounded part of the ring (20). FIG. 6 provides an example of that embodiment.

The animal restraining unit (4) comprises that part of the leash which connects to the animal (101). It may comprise any means of connection including a simple tie around the animal (101) itself or around anything it (101) is wearing, such as a collar or animal harness, connection being to a collar or harness ring if present in each respective case. The animal restraining unit (4) preferably comprises a clasp (60) or a clasp (60) and swivel (61) combination.

If the strap's second end (11) is disposed at the leash's second end (3), disposing the leash loop (13) proximate the operator handling unit (2), the strap end's (11) connection is made to a part of the animal restraining unit (4) identified herein as a restraining unit strap receptor (15). The receptor (15) may comprise nothing more than a slot in some part of the animal restraining unit (4) of size which permits threading by the strap end (11). Preferably, however, it (15) comprises a ring (62) through which the strap (7) extends in either of two modes of connection, further discussed ante.

If, instead, the strap's second end (11) is disposed at the leash's first end (1), disposing the leash loop (13) proximate the animal restraining unit (4), the ring (62) should be present as in the other arrangement or mode, to provide a conduit through which the strap's midlength (12) is permitted to slide freely in a "free-floating" manner, as that arrangement is sometimes characterized. In such arrangement or mode, no attachment loop (17) is present.

The clasp (60) may be combined with a swivel (61) mounted into it (60), or the ring (62) may be an integral part of the swivel (61). It is intended as an optional matter that the invention include any embodiment of connection. While any of the foregoing configurations are acceptable in this arrangement or mode, it is preferable that the animal restraining unit (4) comprise a clasp (60) combined with a swivel (61) and ring (62). While the ring (62) may be of any known ring connecting configuration, a configuration with a straight portion over which the strap's midlength (12) is permitted to slide unimpeded is preferred. D-ring configuraton may be employed. Although not essential to effective leash operation, the straight portion may also be comprised of a cylindrical or wheel-like sleeve and axle construction to enhance passage of the strap's midlength (12) through the ring (62). Embellishments upon such a cylinder would also be possible, such as configuring it with ribs or teeth for a tighter grip upon the strap (7) during its passage if that becomes an objective.

It is not intended that the invention's construction be limited to any particular type of restrailning unit strap receptor (15), if present, or that if a clasp (60), swivel (61) and ring (62) combination comprise one (15), that the ring (62) be limited to any particular shape. While inclusion of the swivel (61) and a D-shaped ring is preferred, other possible features present as part of the attachment receptor (15) merely represent suitable construction alternatives. Similarly, if the strap's second end (11) is disposed at the leash's first end (1), it is not intended that the invention be limited to any particular type of clasp (60), swivel (61) or ring (62) construction. The variations in construction mentioned supra merely represent construction alternatives, if not preferences.

If the manner of connection at the leash's second end (3) is of the kind in which the animal restraining unit (4) has the strap's second end (11) attached to it (4) as distinguished from that in which it permits the the strap's midlength (12) to slide freely through it (4), attachment loop closure fastening means (10) is not limited to any particular kind. Stitchwork, for example, is represented in FIG. 5 for such connection at the leash's second end (3).

The leash adjusting unit (5) is that part of the leash the operator moves along the leash strap (7) to lengthen or shorten the leash. Any means (5) which allows the strap's midlength (12), that portion of the strap (7) between its two ends (8, 11), to slide through it (5) during adjustment but afterwards holds that midlength (12) in place will serve as a leash adjusting unit (5). A simple example comprises a strap (7) folded or tied into what is commonly recognized as a slip knot in which the portion of the knot impinging upon the sliding portion of strap (7) is knotted with sufficient tightness to be firmly held in place and yet permit the midlength (12) to pass through it upon exertion of sufficient force for that purpose.

Figure 3:
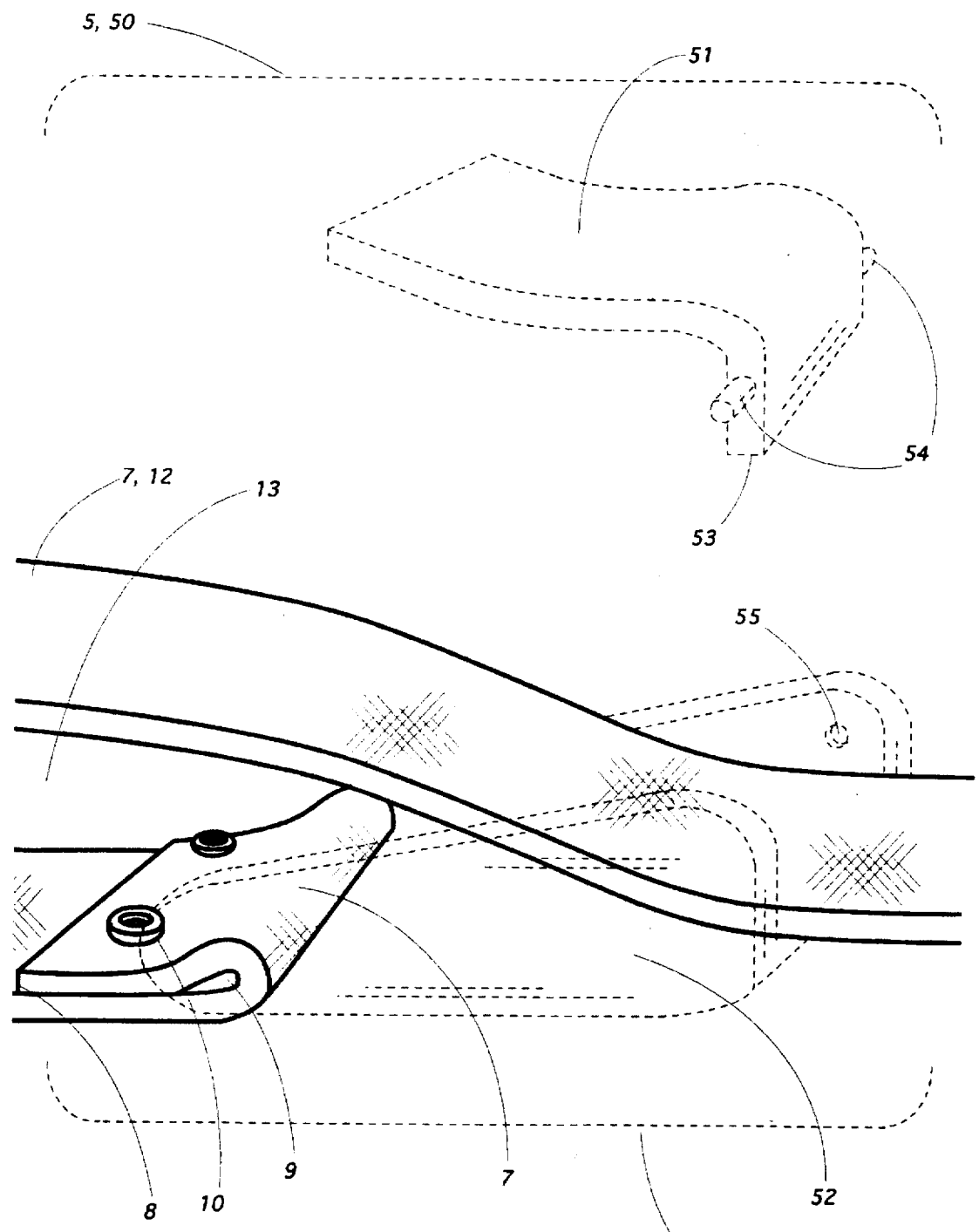
FIG. 3 is a perspective representation of a leash length adjusting unit (5) comprised of a strap pinching adjustment slide (50), the parts thereof shown as a separated, or exploded, view of two parts (50 and 51, respectively) thereof comprising an operable finger lever (51) and a strap compression pad (52). The view also includes a portion of a strap's midlength (12) associated directly with the strap pinching slide (50) and rivets as the loop closure fastening means (10) of the strap's first end (8) which, in all embodiments of the invention, is attached within that unit (5).

Better suited to the task is a strap pinching adjustment slide (50), an example of one of which is shown in FIG. 3. The adjustment slide (50) is an assembly of the two separated parts shown there—a finger lever (51) and a compression pad (52). The finger lever (51) is constructed with pivot pegs (54) which are permitted upon operation of the finger lever (51) to pivot within pivot sockets (55) situated in the compression pad (52). The finger lever (51) also comprises in part an impinging projection (53). When the finger lever is pivoted toward the strap's midlength (12) extending through the adustment slide (50), thereby firmly holding it (12) in place, the impinging projection (53) is forced against the compression pad (52). When the finger lever (51) is pivoted away from the midlength (12), the impinging projection (53) is removed from firm contact with it (12), or said to be released from it, allowing leash length to be adjusted so as to make it either longer or shorter.

There are numerous types and styles of adjustment slides (50) extant. Several have been constructed for use on backpack straps. The slide adjusters of a common pair of suspenders provide simple examples. Some adjustment slides have ribbed impingement projections (53). Some have their pivoting sites located such as to require their finger levers (51) to be rotated in the direction opposite from that others rotate in. Many have the impingement projection (53) constructed so as to become forced against the strap's midlength (12) at an angle, thereby enhancing the slide's (50) grip upon it (12). Some have a network of raised points raised in bold relief upon the compression pad (52) for better strap (7) retention. In some slides (50), the impingement projection (53) could even be comprised of teeth, pins or tines to penetrate the midlength (12). It is preferred that the invention's leash length adjustment unit (5) comprise a strap pinching adjusting slide (50) and that it be constructed generally along the lines of that depicted in FIG. 3. However, where a strap pinching slide (50) is included as part of the invention's structure, it is intended that any embodiment of it (50) be included as an optional matter.

As mentioned, the leash strap's first end (8) is attached to the leash length adjusting unit (5). Where the latter unit (5) comprises a strap pinching adjustment slide (50), attachment may easily be made in manufacture by configuring the strap's first end (8) into an attachment loop thereof (9) and after extending the strap through some part of the adjustment slide (50), such as through a slot in the compression pad (52) and then fastening the loop closed with an appropriate loop closure fastening means (10).

The three units (2, 4, 5) of which the invention is comprised are connected together by a leash strap (7). The strap is comprised of first and second ends (8, 11, respectively) and a midlength (12). It (7) may be constructed of any material known for such purposes including natural or synthetic fibers or any blends thereof. Preferably, strong weatherproof material such as nylon should be used. However, it is intended that the invention's strap (7) may optionally include any fiber now known or yet to be developed.

Upon proper assembly, part of the strap (7) forms a leash loop (13) referred to supra. This loop (13) results from the doubled character of part of the leash strap (7) which attends its freely sliding, or what might be characterized as "free floating", construction. As mentioned, the leash strap's first end (8) is attached to the leash length adjusting unit (5) by loop closure fastening means (10). The strap's second end (11) makes a connection with one end of the leash or the other (1, 3), depending upon which option is selected at time of manufacture.

If the strap's second end (11) is disposed at the leash's first end (1), that comprising the operator handling unit (2), the leash loop (13) would be proximate the leash's second end (3) and the connection site at the leash's second end (3) will be such as to permit the part of the strap's midlength (12) located at that end (3) to move freely through the animal restraining unit (4). As indicated to be the preferred embodiment, supra, the midlength (12) would be made to pass in such fashion through a D-shaped swivel clasp ring (62), as shown in FIG. 5.

The embodiment in which the strap's second end (11) is attached to the leash's second end, that comprising the animal restraining unit (4), is discussed, supra.

When the leash length adjusting unit (5) of the invention comprises a strap pinching adjustment slide (50) in a preferred embodiment of the invention, the effective length of the leash may be shortened, contracting the dog's range of permissible movement, by performing three simple steps: First, the operator flips the pivoting finger lever (51) open, in a direction away from the strap's midlength (12); second, with one hand clutching the operator's handling unit (2), which in preferred embodiments is a hand loop (14), he moves the slide (50) with his free hand in a direction which causes the doubled up leash loop (13) along part of the strap's midlength (12) to increase in length, thereby shortening the leash's length; and third, he resets the finger lever (51) with the thumb or a finger of his free hand, returning it (51) to closed position. When in that position, the midlength (12) is restrained from slipping through the slide (20) by an impingement projection (53) and the leashed dog is restricted to movement within an area of contracted radius. The procedure employed in returning the dog to its previous expanded range of permissible movement is much the same except that in the second step, either the slide (50) must be moved in a direction opposite to that it was moved to rein in the dog, or the slide (50) may be merely allowed to move in response to the force of the dog's tug upon the strap (7).

The adjustment mechanism of the changeable length leash is often taken for granted but not always truly understood. The part of the leash strap extending from the leash length adjusting unit (5) outwards and returning to that unit (5) to end at its proximity is comprised of a length of doubled strap identified elsewhere herein as the leash loop (13).

The midlength's (12) free sliding passage through either the operator handling unit (2) in the one case and the animal restraining unit (4) in the other with the change leash loop (13) length caused by the attendant moving of the length adjusting unit (5) comprises a novel feature for a leash. It should be recognized that it is that feature which permits leash length adjustment.

The length of the leash loop (13) increases as the adjusting unit (5) is moved in a direction away from the loop (13). Since strap midlength (12) is fixed—that is, since the strap itself (7) is of fixed length—an increase in length of the leash loop (13) attending such adjusting unit (5) movement must necessarily shorten leash length. Conversely, a decrease in length of the leash loop (13) attending such movement must necessarily lengthen the leash.

If the arrangement or mode is such that the strap's second end (11) is disposed at the leash's first end (1), In order for a change in length of the leash loop (13) to occur, a portion of the strap's midlength (12) must necessarily be drawn through the animal restraining unit (4). The direction in which it (12) is thus drawn through will depend upon whether the length adjusting unit (5) is moved toward or away from the operator (100).

If the arrangement or mode is the opposite, such that the strap's second end (11) is disposed at the leash's second end (3), in order for a change in length of the leash loop (13) to occur, it must necessarily be the operator handling unit (2) through which a portion of the strap's midlength (12) is drawn. As was the case in the other arrangement, the direction in which the midlength (12) is drawn through will again depend upon whether the length adjusting unit (5) is moved toward or away from the operator (100).

Regardless of arrangement or mode, when the length adjusting unit (5) is moved in a direction toward the leash loop (13) or if the leash loop (13) is allowed to contract because of the animal's tug upon the leash, the length of the leash itself increases. Without the tugging of an animal upon the leash, moving the adjusting unit (5) toward the leash loop (13) in that fashion merely causes slack of the midlength (12) within the leash loop (13), a part of which consequently sags in response to gravity. It is only when tugging tension is applied by the animal (101) or the operator (100) to the leash's second end (3) that the slack is taken up and the decrease in the length of the leash loop (13) increases leash length.

Figure 7:
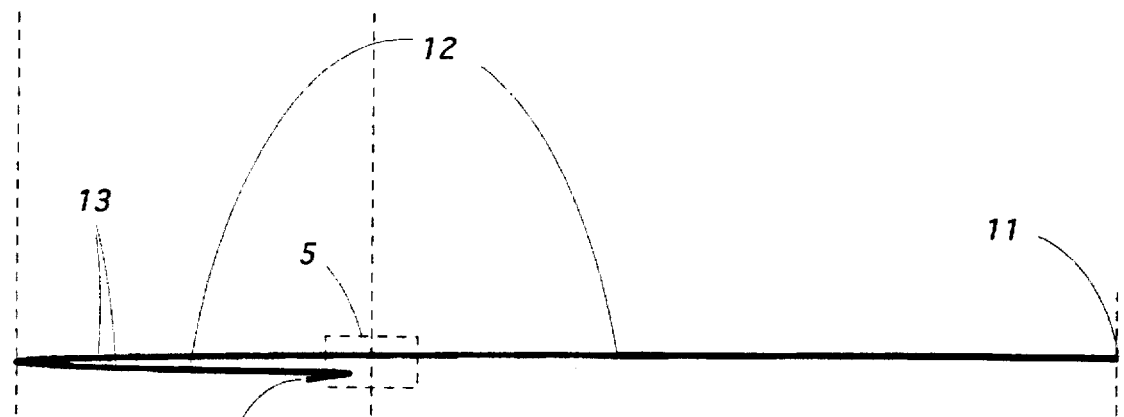
FIGS. 7 and 8 illustrate the manner in which leash length is affected by adjustment of the leash's length adjusting unit (5) and permit a comparison between the relative lengths of the leash loop (13) and the remaining part of the strap (7) following leash length adjustment. Measuring guide lines are shown to aid that observation.
Figure 8:
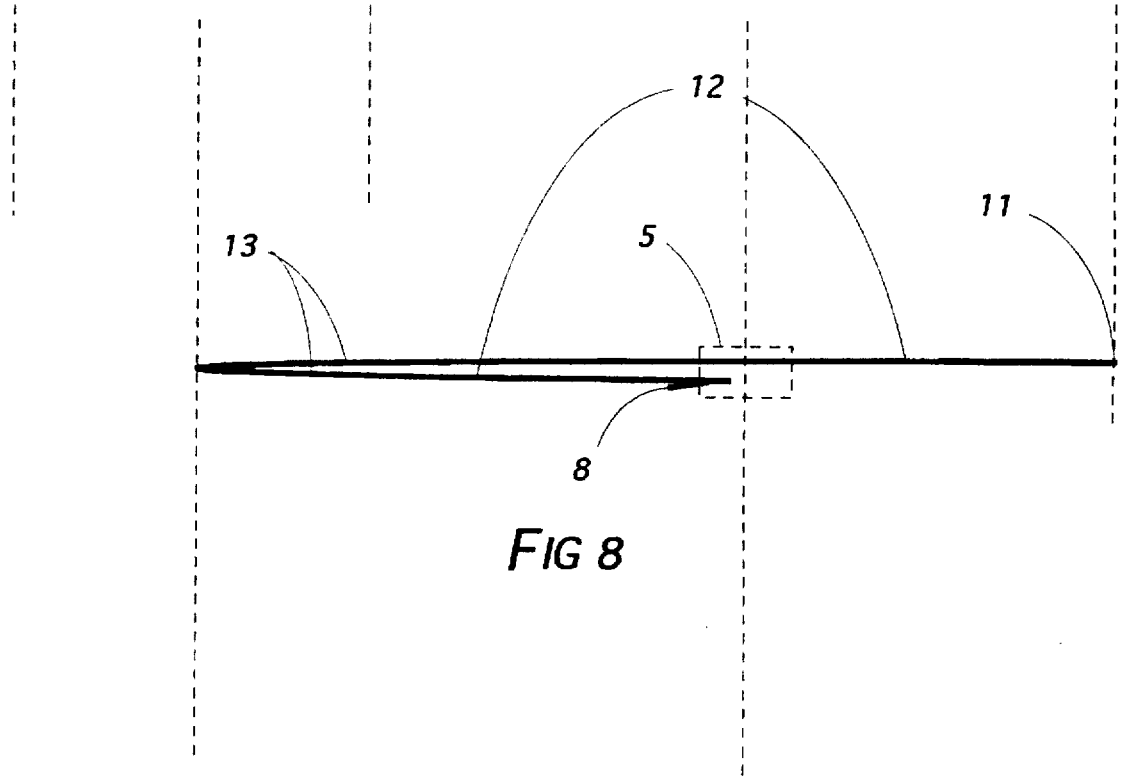

Nor may it be so easily understood that the change in length of the leash loop (13)—and, therefore, the change in leash length—will always be one-half the distance the slide (50) is moved. This is explicitly shown in FIGS. 7 and 8. The rectangular box symbol represents the leash's length adjusting unit (5). The change in leash length accorded to a given change in leash loop (13) size can be observed with reference to the measuring guide lines of the diagram. It should be remembered that in observing those diagrams that the leash loop (13) formed along a portion of the strap's midlength (12) is disposed at the leash end (1, 2) opposite that (2, 1, respectively) at which the strap's second end (11) is disposed; and that in order to ascertain at which side of the diagram represents the first leash end (1) and which the second (3), one must first know which arrangement or mode is being considered. If the arrangement or mode is employed wherein the strap's second end (11) is disposed proximate the operator handling unit (2), disposing the leash loop (13) at the other end, the preferred one, the side of the diagram at which the leash loop (13) is shown represents the leash's second end (3). If the opposite arrangement or mode is employed, the side of the diagram at which the leash loop (13) is shown represents the leash's first end (1).

The principle discussed provides an additional benefit in use of the invention. Laws of physics ordain that the force required to move the adjusting unit (5) a given distance be equal to that required to rein in the animal (101) only half that distance.

On the one hand, the arrangement or mode may be such that the strap's second end (11) is disposed at the leash's first end (1), disposing the leash loop (13) at the leash's second end (3). Under those circumstances, the force required to move the animal (101) may be expended over twice the distance of strap midlength (12) it would be if a conventional leash were employed. Otherwise stated, the force required to move the length adjusting unit (5) over a given distance of midlength (12)—say, one foot—is only half that required to rein in the animal (101) one foot. While it is necessary for the operator (100) to act through a greater distance than that over which the animal (101) is reined in, increase in the distance the operator (100) acts through is a beneficial tradeoff for the reduction in force per increment of action distance. A beneficial feature of leverage is, thus, present.

On the other hand, the arrangement or mode is such that the strap's second end (11) is disposed at the leash's second end (3), disposing the leash loop (13) at the leash's first end (1). As in the first case, the force required to move the animal (101) is still expended over twice the distance of strap midlength (12) it would be if a conventional leash were employed. Just as in the reverse situation, the force required to move the length adjusting unit (5) over a given distance of midlength (12)—say, one foot—is again half that required to rein in the animal (101) one foot. While the operator (100) is required to act through a greater distance than that over which the animal (101) is reined in, increase in operator action distance is again a beneficial tradeoff for the decrease in force per increment of operator action distance. In either arrangement or mode, then, the feature of leverage works to benefit the operator's (100) best interests.

The first of these two arrangements or modes is preferred, however, because to move the length adjusting unit (5) in a direction away from the operator (100) in order to rein the animal (101) inwards and vice-versa might be awkward, involving movement in one direction to accomplish work oppositely directed. Moving the adjusting unit (5) in a direction toward the operator (100) in order to rein the animal (101) inwards accords better with ergonomic principles relating to human motion and permits operator (100) adjusting movements to be consistent with and take advantage of the animal's (101) momentum during its (101) movement. While it is not intended the invention be limited as to one option or another in such respects, it is preferred that an arrangement or mode by which the strap's second end (11) is disposed at the leash's first end (1), rather than the obverse, be employed.

The inventor hereby claims:

1. A changeable length animal leash comprising
   a first leash end comprising an operator handling unit;
   a second leash end comprising an animal restraining unit;
   a strap; and
   a leash length adjusting unit; the leash's strap comprising
      a first end attaching to the adjusting unit;
      a second end; and
      a midlength disposed to extend through the adjusting unit, the portion thereof extending outward from the adjusting unit and returning to it comprising a leash loop; the strap's second end disposed at one of:
         the operator handling unit at the leash's first end, disposing the leash loop to slide freely through the animal restraining unit at the leash's second end; and
         a restraining unit strap receptor in the animal retention unit at the leash's second end, disposing the leash loop at the operator handling unit at the leash's first end;
         whereby the length adjusting unit may be operatively moved along the strap's midlength to adjust the leash to any selected position between full and half length.

2. The changeable length animal leash according to claim 1, wherein the operator handling unit comprises an operator hand loop formed at the strap's second end disposed at the leash's first end, the animal restraining unit through which the leash loop freely slides comprises a ringed swivel clasp and the leash length adjusting unit comprises a strap pinching adjustment slide.

3. The changeable length animal leash according to claim 2, wherein the ring of the swivel clasp is D-shaped wherein the sliding of the leash loop is unimpeded by the ring's curvature.

4. The changeable length animal leash according to claim 1, wherein the strap's second end disposed at the leash's second end comprises an attachment loop attaching to the restraining unit strap receptor of the animal restraining unit, disposing the leash loop to slide freely through the operator handling unit at the leash's first end, the operator handling unit comprising a handle ring.

5. The changeable length animal leash according to claim 3, wherein the ring of the handle is D-shaped wherein the sliding of the leash loop is unimpeded by the ring's curvature.

6. A changeable length animal leash comprising
   a first leash end;
   a second leash end comprising a ringed swivel clasp;
   a strap pinching adjustment slide;
   a strap comprising
      a first end attaching to the adjustment slide;
      a midlength disposed to extend through the slide, the portion thereof extending outward from the slide and returning to it comprising a leash loop; and the strap's second end disposed at one of:
         a second end forming an operator hand loop disposed at the leash's first end, disposing the leash loop to slide freely through the animal restraining unit at the leash's second end;
         whereby the adjustment slide may be operatively moved along the strap's midlength to adjust the leash to any selected position is between full and half length.

7. A method for the manufacture of a dog leash comprising attaching an operator hand loop to a leash strap at the leash's first end;

connecting a ringed swivel clasp to a leash strap's midlength proximate the leash's second end;

emplacing a strap pinching adjusting slide upon the leash strap's midlength;

attaching the strap's first end to the adjusting slide;

connecting the leash's second end to one of:

any part of the dog;

any object worn by the dog including a dog collar;

an attachment ring upon any object worn by the dog;

whereby the range of the dog's action may be increased or decreased to any position between full and half leash length by moving the strap pinching slide along the leash strap in one of:

a direction toward a leash loop disposed upon the leash; and direction away from the leash loop.

* * * * *